(12) United States Patent
Iyer et al.

(10) Patent No.: US 11,265,183 B1
(45) Date of Patent: Mar. 1, 2022

(54) ASYNCHRONOUS MEETING MANAGEMENT FOR COLLABORATION SOLUTIONS

(71) Applicant: Dell Products L.P., Hopkinton, MA (US)

(72) Inventors: Vivek Viswanathan Iyer, Austin, TX (US); Loo Shing Tan, Singapore (SG); Jonathan Sebastian Yarborough Wood, Singapore (SG)

(73) Assignee: DELL PRODUCTS L.P., Hopkinton, MA (US)

( * ) Notice: Subject to any disclaimer, the term of this patent is extended or adjusted under 35 U.S.C. 154(b) by 0 days.

(21) Appl. No.: 17/156,187

(22) Filed: Jan. 22, 2021

(51) Int. Cl.
*H04L 12/18* (2006.01)
*H04L 29/06* (2006.01)
*G06Q 10/10* (2012.01)
*H04L 65/401* (2022.01)

(52) U.S. Cl.
CPC ....... *H04L 12/1831* (2013.01); *G06Q 10/103* (2013.01); *H04L 12/1822* (2013.01); *H04L 65/4015* (2013.01)

(58) Field of Classification Search
CPC ............. H04L 12/1831; H04L 12/1822; H04L 65/4015; G06Q 10/103
See application file for complete search history.

(56) References Cited

U.S. PATENT DOCUMENTS 10,616,345 B1 * 4/2020 Ouimette ................ H04L 67/26
2009/0327425 A1 * 12/2009 Gudipaty ............ H04L 65/1093
709/205

\* cited by examiner

*Primary Examiner* — Brian Whipple
(74) *Attorney, Agent, or Firm* — Chamberlain, Hrdlicka, White, Williams & Aughtry

(57) ABSTRACT

A method for conducting and managing collaboration sessions as asynchronous meetings that are just as effective as live (or synchronous) meetings. Specifically, the disclosed method enables asynchronous meetings where participants may join meetings and engage with content, and contribute at different points in time. The disclosed method engages around content and interaction, and summarizes results into a meaningful form. Accordingly, the disclosed method addresses a limitation of conducting meetings today, which require all participants to attend, focus, and contribute at the same time.

20 Claims, 11 Drawing Sheets

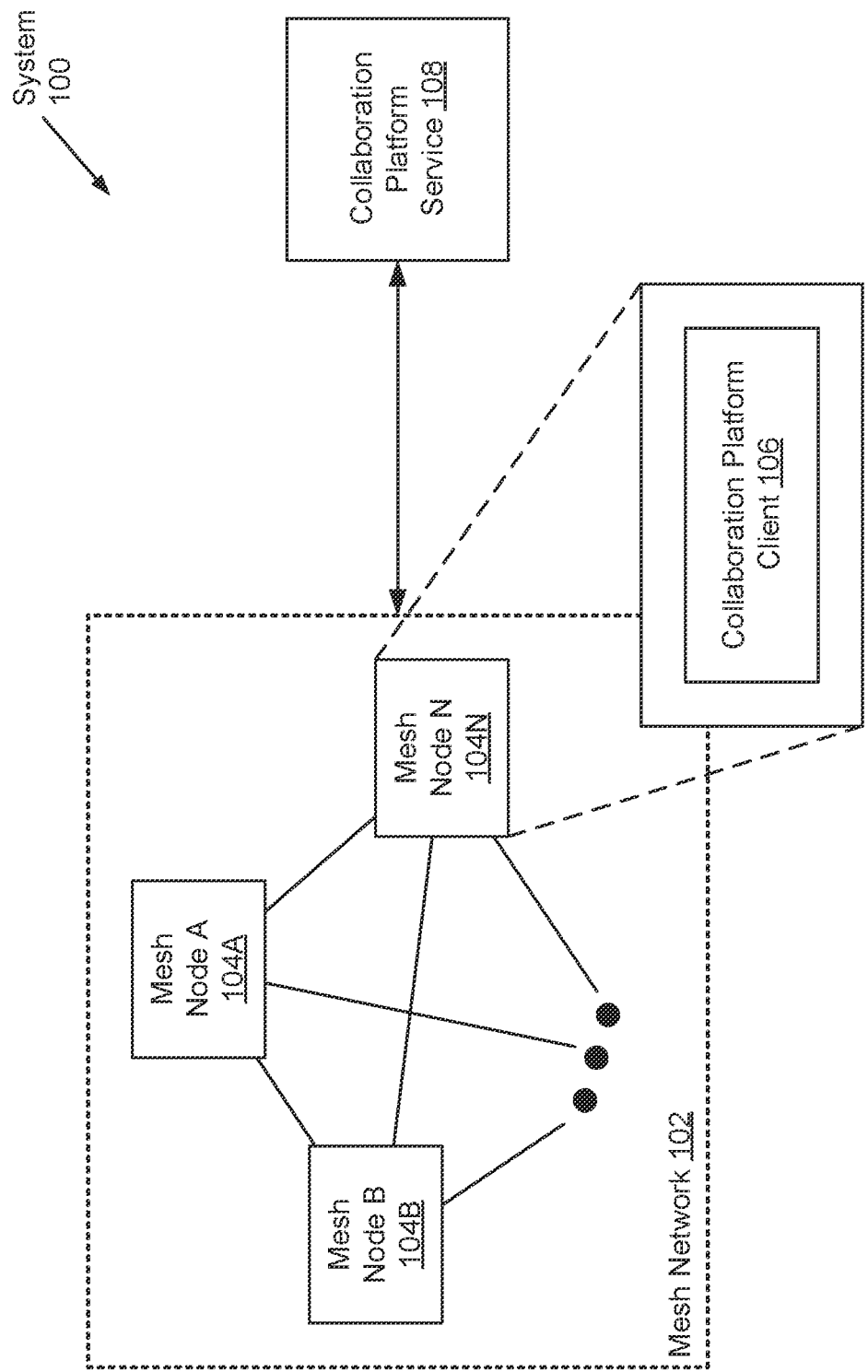

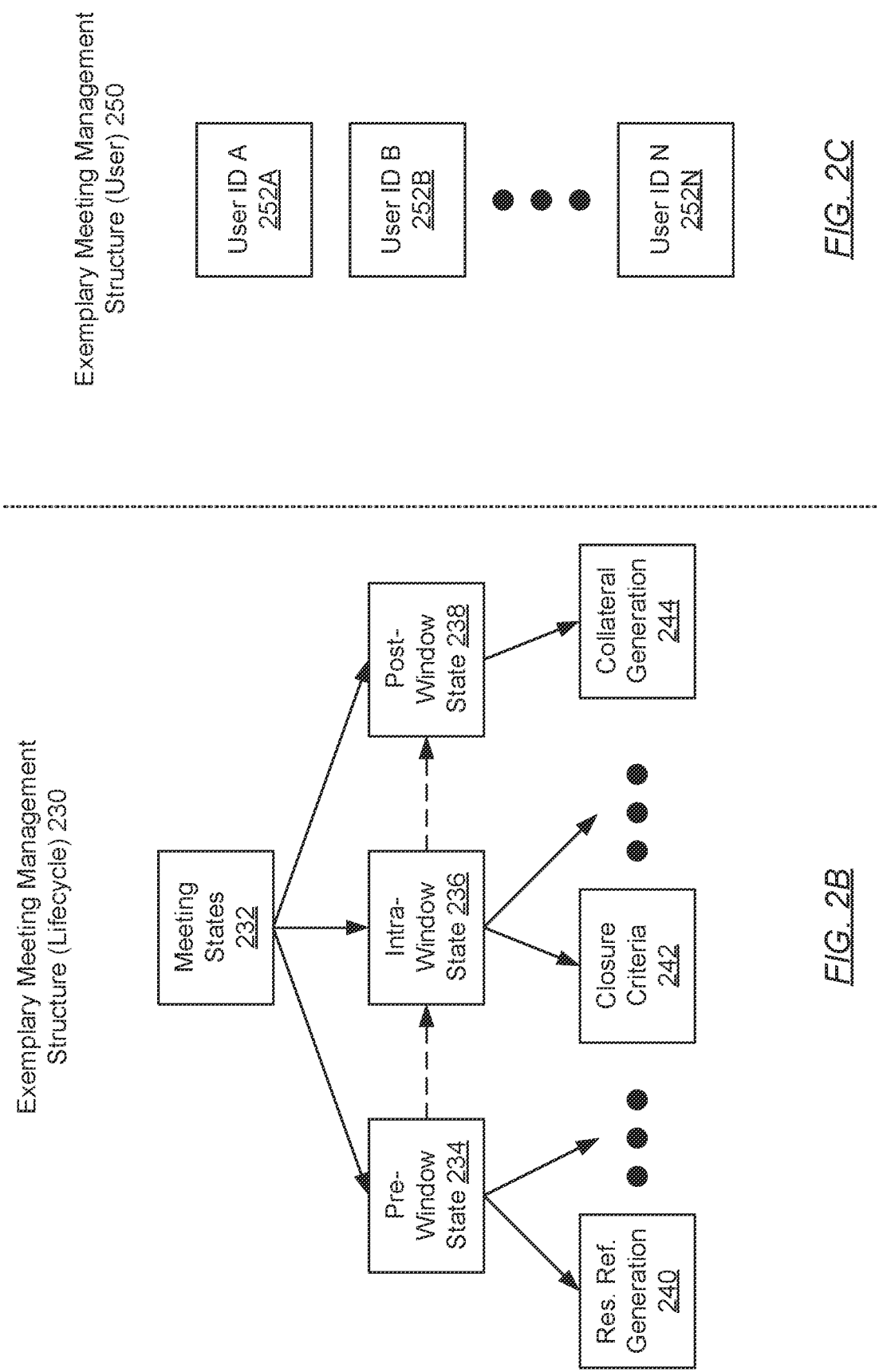

ASYNCHRONOUS MEETING MANAGEMENT FOR COLLABORATION SOLUTIONS

BACKGROUND

Throughout the modern age, computers and networking have facilitated countless processes. One such process is collaboration, implemented mainly using live (or synchronous) meetings. These live meetings, however, require all participants to attend, focus, and contribute at the same time.

SUMMARY

In general, in one aspect, the invention relates to a method for asynchronous meeting management. The method includes performing, by a collaboration platform service and until a window closure criterion for an asynchronous meeting is met, an iterative process, that includes receiving user-specific meeting context from one selected from a group consisting of a meeting organizer and a non-meeting organizer, of the asynchronous meeting, maintaining a meeting management structure using at least a portion of the user-specific meeting context, inferring a meeting-relevant recommendation from at least a portion of the meeting management structure, and transmitting the meeting-relevant recommendation to the one selected from the group consisting of the meeting organizer and the non-meeting organizer, of the asynchronous meeting.

In general, in one aspect, the invention relates to a non-transitory computer readable medium (CRM). The non-transitory CRM includes computer readable program code, which when executed by a computer processor, enables the computer processor to perform a method for asynchronous meeting management. The method includes performing, by a collaboration platform service and until a window closure criterion for an asynchronous meeting is met, an iterative process, that includes receiving user-specific meeting context from one selected from a group consisting of a meeting organizer and a non-meeting organizer, of the asynchronous meeting, maintaining a meeting management structure using at least a portion of the user-specific meeting context, inferring a meeting-relevant recommendation from at least a portion of the meeting management structure, and transmitting the meeting-relevant recommendation to the one selected from the group consisting of the meeting organizer and the non-meeting organizer, of the asynchronous meeting.

Other aspects of the invention will be apparent from the following description and the appended claims.

BRIEF DESCRIPTION OF DRAWINGS

FIG. 1 shows a system in accordance with one or more embodiments of the invention.

FIG. 2B shows an exemplary meeting management structure in accordance with one or more embodiments of the invention.

FIG. 2C shows an exemplary meeting management structure in accordance with one or more embodiments of the invention.

DETAILED DESCRIPTION

Figure 2A:
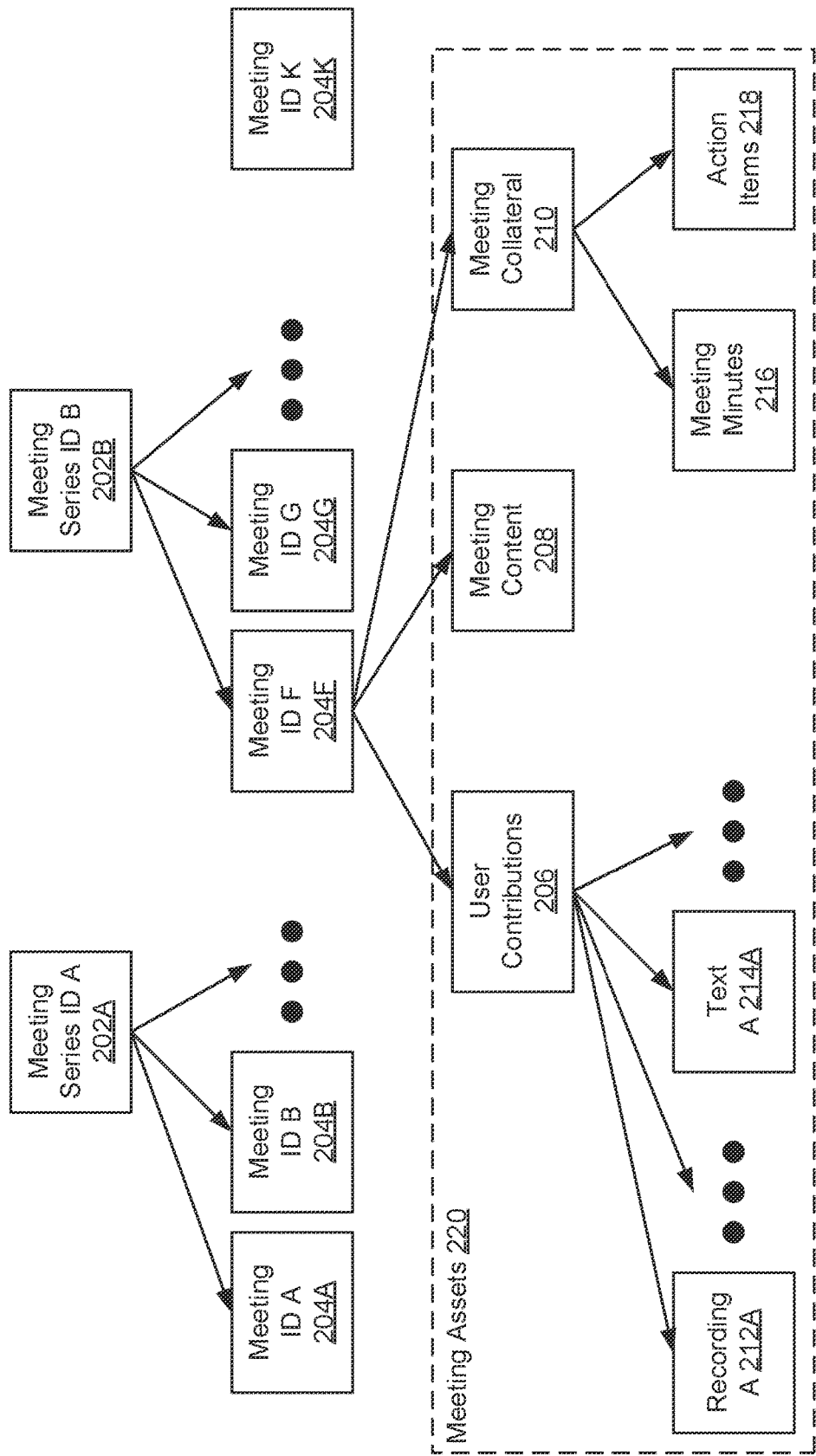
FIG. 2A shows an exemplary meeting management structure in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method for conducting and managing collaboration sessions as asynchronous meetings that are just as effective as live (or synchronous) meetings. Specifically, the disclosed method enables asynchronous meetings where participants may join meetings and engage with content, and contribute at different points in time. The disclosed method engages around content and interaction, and summarizes results into a meaningful form. Accordingly, the disclosed method addresses a limitation of conducting meetings today, which require all participants to attend, focus, and contribute at the same time.

FIG. 1 shows a system in accordance with one or more embodiments of the invention. The system (100) may include two or more mesh nodes (104A-104N) operatively connected to a collaboration platform service (108). Each of these system (100) components is described below.

In one embodiment of the invention, a mesh node (104A-104N) may represent any physical appliance or computing system configured to receive, generate, process, and/or transmit data, as well as to provide an environment in which at least a collaboration platform client (106) (described below) may operate thereon. In providing the aforementioned environment, a mesh node (104A-104N) may include and allocate various resources (e.g., computer processors, memory, storage, virtualization, networking, etc.), as needed, for at least the collaboration platform client (106) thereon to consume. One of ordinary skill will appreciate that a mesh node (104A-104N) may support other software and/or firmware, and may perform other functionalities without departing from the scope of the invention. Examples of a mesh node (104A-104N) may include, but are not limited to, a desktop computer, a laptop computer, a tablet computer, a smartphone, an intelligent or interactive display, a smart television, or any other computing system similar to the exemplary computing system shown in FIG. 6.

In one embodiment of the invention, each mesh node (104A-104N) may connect directly or indirectly (i.e., via a switch, a router, or any other network device (not shown)) to every other mesh node (104A-104N), thereby forming a mesh network (102). The mesh network (102) may therefore refer to a dynamic and non-hierarchical (or decentralized) network topology, where the mesh nodes (104A-104N) may include functionality to self-organize and self-configure. In this mesh network (102) formation, tasks and/or workloads may be distributed across the constituent mesh nodes (104A-104N).

In one embodiment of the invention, a collaboration platform client (106) may refer to software, firmware, or a combination thereof, which enables features and functionalities of a collaboration platform to execute or operate on the underlying hardware of any mesh node (104A-104N). The aforementioned collaboration platform may entail any service or tool (also referred to as groupware) that facilitates team or group collaboration—examples of which may include, but are not limited to, voice over Internet Protocol (VoIP) services, video-conferencing services, document sharing services, messaging services, email services, group calendar services, or any combination thereof. Further, each collaboration platform client (106) (respectively on each mesh node (104A-104N)) may include functionality to communicate, and thus exercise peer-to-peer (P2P) networking, with every other collaboration platform client (106) (respectively on every other mesh node (104A-104N)). Moreover, any collaboration platform client (106) may include additional functionality to communicate, or otherwise interact, with the collaboration platform service (108). One of ordinary skill will appreciate that any collaboration platform client (106) may perform other functionalities without departing from the scope of the invention.

In one embodiment of the invention, for any given asynchronous collaboration session (also referred to as an asynchronous meeting), one of the collaboration platform clients (106) (or one of the mesh nodes (104A-104N)) may take on the role of the session or meeting organizer (as well as a session/meeting participant), whereas the remaining collaboration platform clients (106) (or the remaining mesh nodes (104A-104N)) may each take on the role of a non-session or non-meeting organizer (as well as another session/meeting participant). The session/meeting organizer may refer to the entity responsible for creating, hosting, or initializing the given asynchronous meeting and, accordingly, may at least perform the methods outlined in FIGS. 3A and 3B, below, which are collectively directed to asynchronous meeting instantiation and participation. Further, the session/meeting organizer may embody (or operate on) a private device—i.e., a physical computing device (e.g., desktop computer, laptop computer, tablet computer, smartphone, etc.) belonging to and operated by an individual user. On the other hand, a non-session/meeting organizer may refer to an entity selected or invited, by the session/meeting organizer, to join and participate in the given asynchronous meeting. To that extent, each non-session/meeting organizer may at least perform the methods outlined in FIGS. 5A and 5B, below, which are collectively directed to asynchronous meeting participation. A non-session/meeting organizer may embody (or operate on) another private device (described above). One of ordinary skill will appreciate that the session/meeting organizer and each non-session/meeting organizer may perform other functionalities without departing from the scope of the invention.

In one embodiment of the invention, the collaboration platform service (108) may represent information technology (IT) infrastructure configured for collaboration platform back-end support. To that extent, the collaboration platform service (108) may include functionality to at least perform the method outlined in FIGS. 4A-4C, below, which are collectively directed to asynchronous meeting management. To assist in the management of one or more asynchronous meetings, the collaboration platform service (108) may also include functionality to maintain one or more meeting management structures (described below) (see e.g., FIGS. 2A-2C). One of ordinary will appreciate that the collaboration platform service (108) may perform other functionalities without departing from the scope of the invention. Furthermore, the collaboration platform service (108) may be implemented using one or more servers (not shown). Each server may represent a physical or virtual server, which may reside in a data center or cloud computing environment. Additionally, or alternatively, the collaboration platform service (108) may be implemented using one or more computing systems similar to the exemplary computing system shown in FIG. 6.

In one embodiment of the invention, the above-mentioned system (100) components may communicate with one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, in communicating with one another, the above-mentioned system (100) components may employ any combination of wired and/or wireless communication protocols.

While FIG. 1 shows a configuration of components, other system (100) configurations may be used without departing from the scope of the invention.

FIG. 2A shows an exemplary meeting management structure in accordance with one or more embodiments of the invention. Generally, a meeting management structure may refer to a data object or data structure employed to facilitate management (i.e., organization, consolidation, and access) of one or more aspects (or domains) of one or many asynchronous meeting(s) (or meeting series thereof). By way of an example, a possible configuration of a meeting management structure (200), purposed for meeting asset management, is illustrated in FIG. 2A and described below.

In one embodiment of the invention, a meeting asset (220) may represent any form or format of information, which may describe the collaborative discussion, topic, and/or focus of, or may be otherwise associated with, a given asynchronous meeting. The exemplary meeting management structure (200), accordingly, provides a scheme through which the aforementioned information, pertinent to one or more asynchronous meetings (204A, 204B, 204F, 204G, 204K) (or meeting series (202A, 202B) thereof) may be stored and indexed to facilitate retrieval. A meeting series (e.g., 202B) may refer to a collection of related asynchronous meetings (e.g., 204F, 204G).

Meeting assets (220) exemplified in the exemplary meeting management structure (200) include user contributions (206), meeting content (208), and meeting collateral (210). A user contribution (206) may encompass any authorized form of adjustment (or manipulation)—e.g., amendment, edit, deletion, correction, insertion, etc.—to meeting content (208) or other information co-created by any subset or all of the list of participants associated with the given asynchronous meeting, which may be reflective of the collaborative discussion, topic, or focus. The aforementioned adjustment may, for example, be implemented through video and/or audio recording(s) (212A), which capture user dialogue expressed during the given asynchronous meeting; and/or text-based user inputs (214A), such as comments, tags, questions, and other forms of electronic documentation that can be applied to or associated with the meeting content (208) (or other co-created information).

Furthermore, meeting content (208) may refer to one or more forms of information, which may facilitate the conveyance of the collaborative discussion, topic, and/or focus of the created asynchronous meeting. By way of examples, meeting content may include, but is not limited to, one or more electronic text documents, one or more electronic slide presentations, one or more electronic images, one or more animations, one or more videos, any other electronic multimedia, or any combination thereof.

Moreover, meeting collateral (210) may represent key meeting-relevant information generated following the closure of an asynchronous meeting. Examples of meeting collateral may include, but are not limited to: meeting summaries or notes concisely describing events that had transpired during the asynchronous meeting, one or more action items assigned to one or more session/meeting participants following the asynchronous meeting, and consensus(es) reached amongst the session/meeting participants during the asynchronous meeting.

FIG. 2B shows an exemplary meeting management structure in accordance with one or more embodiments of the invention. Generally, a meeting management structure may refer to a data object or data structure employed to facilitate management (i.e., organization, consolidation, and access) of one or more aspects (or domains) of one or many asynchronous meeting(s) (or meeting series thereof). By way of an example, a possible configuration of a meeting management structure (230), purposed for meeting lifecycle management, is illustrated in FIG. 2B and described below.

In one embodiment of the invention, a meeting lifecycle may reference a series of stages or states (232), in functional activity, through which any given asynchronous meeting transpires or may be conducted. The exemplary meeting management structure (230), accordingly, provides a scheme through which the aforementioned series of stages/states (232) may be followed, and actions or information pertinent to each stage/state (232) may be recorded.

Meeting stages (or states) (232) exemplified in the exemplary meeting management structure (230) include a pre-window state (234), an intra-window state (236), and a post-window state (238). The pre-window state (234) entails respective actions, performed by a meeting organizer, a non-meeting organizer, or the collaboration platform service, prior to a window activation timestamp configured for a given asynchronous meeting. Further, the intra-window state (236) entails respective actions, performed by a meeting organizer, a non-meeting organizer, or the collaboration platform service, during or between the window action timestamp and the meeting of window closure criterion/criteria configured for the given asynchronous meeting. Moreover, the post-window state (238) entails respective actions, performed by a meeting organizer, a non-meeting organizer, or the collaboration platform service, after the window closure criterion/criteria has/have been met.

In one embodiment of the invention, the window activation timestamp may reference a prospective date and/or time at which the given asynchronous meeting is set to commence, whereas the window closure criterion/criteria may describe one or more conditions or rules, which may mark a termination of the asynchronous meeting. By way of an example, the window closure criterion/criteria may be time-based—e.g., may indicate a window termination timestamp (or a specified time period following the window activation timestamp) at which the given asynchronous meeting may be set to end. By way of another example, the window closure criterion/criteria may be contribution-based—e.g., may specify the number of rounds (or cycles) of user contribution(s) (described below), from each meeting participant, which should be applied throughout the given asynchronous meeting. Other window closure criterion/criteria may be employed without departing from the scope of the invention.

Concerning the pre-window state (234), actions and/or information pertinent to the aforementioned state may include, but are not limited to, the generation of a meeting resource reference (240). A meeting resource reference may represent an address (or a location on a computer network) (e.g., a uniform resource locator or URL) where at a shared data repository associated with the given asynchronous meeting may reside. The shared data repository may refer to a dedicated, virtual data storage space on the collaboration platform service wherein information (e.g., a collection of meeting assets (see e.g., FIG. 2A)) pertinent to the given asynchronous meeting may be stored and accessed from.

Concerning the intra-window state (236), actions and/or information pertinent to the aforementioned state may include, but are not limited to, the window closure criterion/criteria (242) (described above) used to define the circumstances in which the aforementioned state terminates. Meanwhile, concerning the post-window state (238), actions and/or information pertinent to the aforementioned state may include, but are not limited to, the generation of meeting collateral (244) (described above) (see e.g., FIG. 2A) associated with the given asynchronous meeting.

FIG. 2C shows an exemplary meeting management structure in accordance with one or more embodiments of the invention. Generally, a meeting management structure may refer to a data object or data structure employed to facilitate management (i.e., organization, consolidation, and access) of one or more aspects (or domains) of one or many asynchronous meeting(s) (or meeting series thereof). By way of an example, a possible configuration of a meeting management structure (250), purposed for meeting participant or user management, is illustrated in FIG. 2C and described below.

In one embodiment of the invention, a meeting participant or user may refer to an individual (or individuals) operating a mesh node (described above) (see e.g., FIG. 1) representative of, or host to, a meeting organizer or a non-meeting organizer. The exemplary meeting management structure (250), accordingly, provides a scheme through which various meeting participants/users (252A-252N), which may have participated in one or more asynchronous meetings, may be recorded and indexed.

While FIGS. 2A-2C each show a configuration of components representative of a meeting management structure, one of ordinary skill will appreciate that other meeting management structure (200, 230, 250) configurations—directed to asset, lifecycle, or user aspects of one or more asynchronous meetings—may be used without departing from the scope of the invention. Further, one of ordinary skill will appreciate that asynchronous meeting management may entail additional or alternative meeting management structures, which may be directed to other asynchronous meeting aspects (or domains).

Figure 3A:
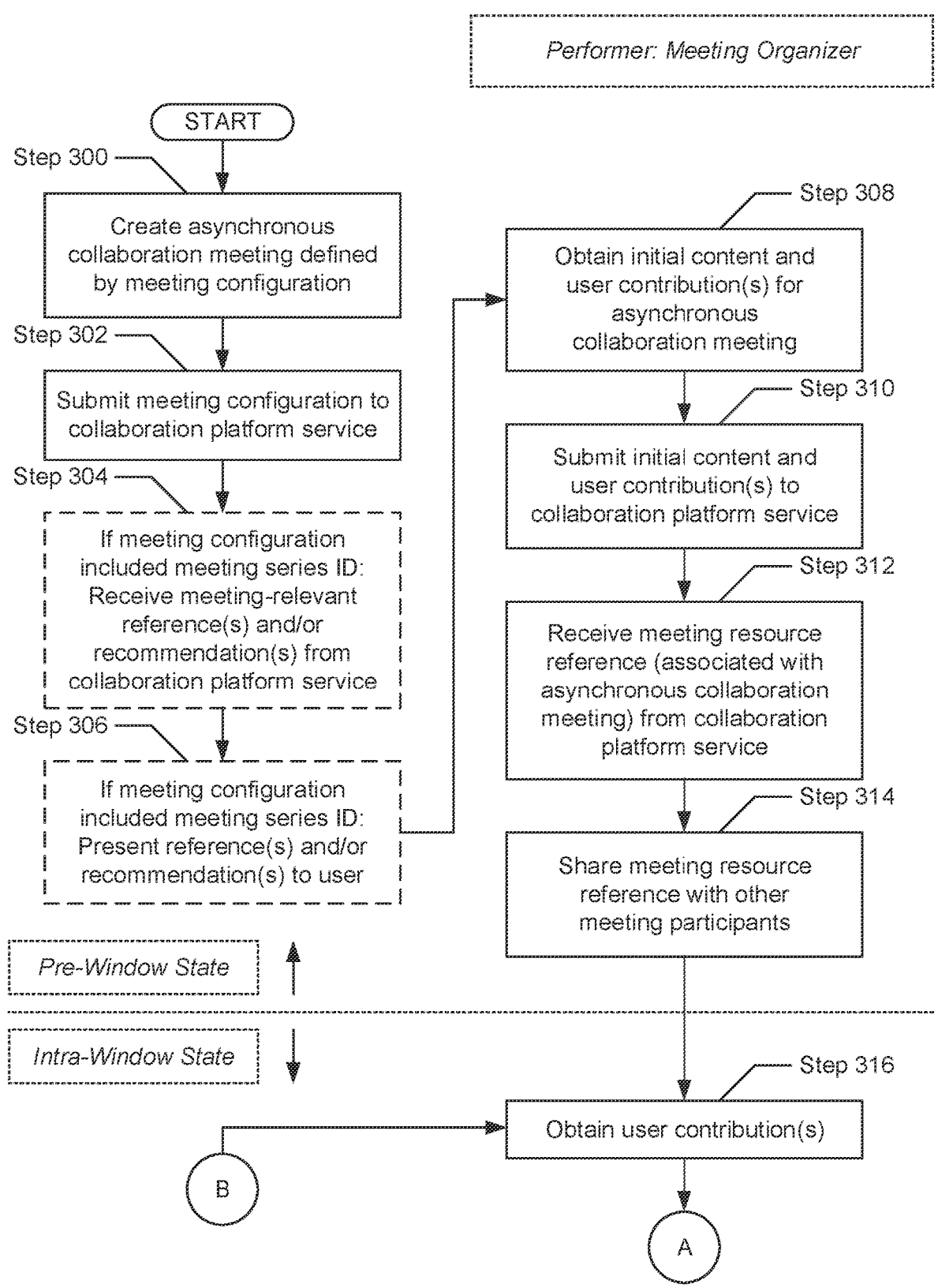
FIGS. 3A and 3B show flowcharts describing a method for asynchronous meeting instantiation and participation in accordance with one or more embodiments of the invention.
Figure 3B:
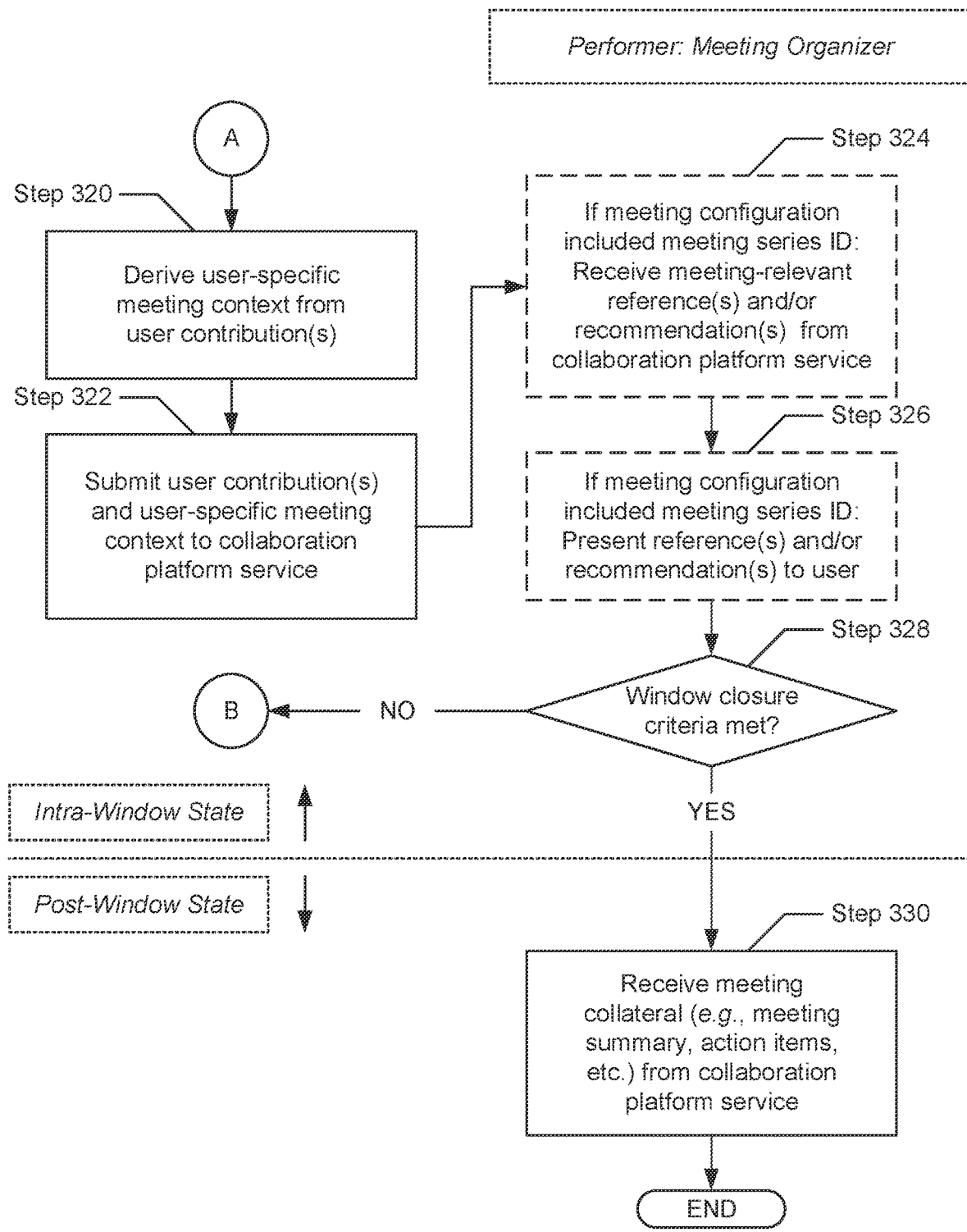

FIGS. 3A and 3B show flowcharts describing a method for asynchronous meeting instantiation and participation in accordance with one or more embodiments of the invention. The various steps outlined below may be performed by a session/meeting organizer (described above) (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 3A, in Step 300, an asynchronous meeting is created. Generally, in one embodiment of the invention, an asynchronous meeting may refer to a collaboration session, amongst local (i.e., co-located) and/or remote (i.e., physically distant) collaborators, which may transpire or may be conducted asynchronously (i.e., not in real-time). Further, creation of the asynchronous meeting may be defined through a meeting configuration—parameters of which may have been selected by a user of the session/meeting organizer, or generated by the session/meeting organizer Examples of the aforementioned parameters may include, but are not limited to: a list of meeting participants (i.e., the user of the session/meeting organizer and the user(s) of at least one non-session/meeting organizer); a meeting identifier (ID) assigned to the created asynchronous meeting; a meeting series ID assigned to an asynchronous meeting series (or a collection of related asynchronous meetings) with which the created asynchronous meeting may be associated (note: should the created asynchronous meeting represent a first of such related asynchronous meetings, then the meeting series ID may not be provided in the meeting configuration); a window activation timestamp referencing a prospective date and/or time at which the created asynchronous meeting is set to commence; and a window closure criterion (or criteria) describing one or more conditions or rules, which may mark a termination of the created asynchronous meeting.

In one embodiment of the invention, the above-mentioned window (or meeting window) of a given asynchronous meeting may reference an elapsed time (i.e., a span of time or difference between a specified beginning time and a specified ending time) of the given asynchronous meeting, wherein any non-real-time user contributions (described below), by/from the list of meeting participants, are permitted.

In Step 302, the meeting configuration, defining the asynchronous meeting (created in Step 300), is submitted to the collaboration platform service (described above) (see e.g., FIG. 1). In one embodiment of the invention, the collaboration platform service may use the meeting configuration (or at least a portion thereof) to update or maintain one or more meeting management structures (described above) (see e.g., FIGS. 2A-2C), retrieve one or more meeting-relevant references, and/or generate or infer one or more meeting-relevant recommendations (described below).

Hereinafter, in one embodiment of the invention, if the above-mentioned meeting configuration specified a meeting series ID, then the process proceeds to Step 304. On the other hand, in another embodiment of the invention, if the above-mentioned meeting configuration excluded a meeting series ID, then the process alternatively proceeds to Step 308.

In Step 304, one or more meeting-relevant references is/are received from the collaboration platform service. In one embodiment of the invention, a meeting-relevant reference may encompass a meeting asset (described above) (see e.g., FIG. 2A) associated with any given past (or previously conducted) asynchronous meeting pertaining to the asynchronous meeting series to which the created asynchronous meeting belongs. Examples of a meeting-relevant reference may include, but are not limited to: any form of meeting-pertinent user contribution(s) (e.g., video and/or audio recording(s) capturing user dialogue expressed during the pre-window and intra-window states of the given past asynchronous meeting, text-based user inputs such as comments, edits, and/or questions, etc.); meeting content—e.g., shared electronic text document, electronic slide presentation, multi-media, etc.—representative of the meeting-pertinent discussion, topic, or focus; and meeting collateral (e.g., a meeting summary or set of notes concisely describing events that had transpired within the intra-window state of the given past asynchronous meeting, one or more action items assigned to one or more session/meeting participants following the given past asynchronous meeting, consensus(es) reached amongst the session/meeting participants during the given past asynchronous meeting, etc.).

Furthermore, in one embodiment of the invention, one or more meeting-relevant recommendations is/are also received from the collaboration platform service. A meeting-relevant recommendation may encompass a course of action—suggestive, disciplinary, or otherwise—put forth by the collaboration platform service, which may facilitate team cohesion, alignment, churn, and/or efficiency management. Through said management, consensus, amongst the list of meeting participants, concerning the collaborative discussion, topic, or focus, may be achieved and enforced. For example, should a meeting participant fail to remember any consensus reached amongst the list of meeting participants during any past asynchronous meeting of the asynchronous meeting series, or persists to push an agenda contradictive to any reached consensus established in any past asynchronous meeting of the asynchronous meeting series, a meeting-relevant recommendation may be relayed to the meeting participant, which would propose that they take action to conform to the consensus. Consensus violations (as well as meeting-relevant recommendations pertinent thereto) may be detected based on user intent derivations (or inferences) attained via artificial intelligence and/or machine learning analysis of past asynchronous meeting collateral (described above) (see e.g., FIG. 2A), meeting content (described above) (see e.g., FIG. 2A), user contributions (described above) (see e.g., FIG. 2A), and/or user-specific meeting context (described below).

In Step 306, the meeting-relevant reference(s) and/or the meeting-relevant recommendation(s) (received in Step 304) is/are presented to the user of the meeting organizer for consideration.

In Step 308, initial meeting content, pertinent to the asynchronous meeting (created in Step 300), is obtained from the user of the session/meeting organizer. In one embodiment of the invention, the initial meeting content may refer to one or more forms of information, which may facilitate the collaborative discussion, topic, and/or focus of the created asynchronous meeting. By way of examples, the initial meeting content may include, but is not limited to, one or more electronic text documents, one or more electronic slide presentations, one or more electronic images, one or more animations, one or more videos, any other electronic multi-media, or any combination thereof. The initial meeting content (or at least a portion thereof) may or may not include, or may or may not have been conceived or influenced by, information captured by and/or derived (or inferred) from the meeting-relevant reference(s) and/or the meeting-relevant recommendation(s) (received in Step 304).

Furthermore, in one embodiment of the invention, one or more user contributions, pertinent to the asynchronous meeting (created in Step 300), is/are also obtained from the user of the session/meeting organizer A user contribution may encompass any authorized form of adjustment (or manipulation)—e.g., amendment, edit, deletion, correction, insertion, etc.—to meeting content or information co-created by any subset or all of the list of participants, and reflective of the collaborative discussion, topic, or focus. Other than direct changes to the meeting content (or co-created information), user contributions may also include, but are not limited to, comments, tags, questions, and other forms of electronic documentation that can be applied to or associated with the meeting content (or co-created information). The user contribution(s) (or at least a portion thereof) may or may not include, or may or may not have been conceived or influenced by, information captured by and/or derived (or inferred) from the meeting-relevant reference(s) and/or the meeting-relevant recommendation(s) (received in Step 304).

In Step 310, the initial meeting content and/or the user contribution(s) (obtained in Step 308) is/are submitted to the collaboration platform service. In one embodiment of the invention, the collaboration platform service may use the meeting configuration (or at least a portion thereof) to update or maintain one or more meeting management structures (described above) (see e.g., FIGS. 2A-2C).

In Step 312, a meeting resource reference, associated with the asynchronous meeting (created in Step 300), is received from the collaboration platform service. In one embodiment of the invention, the meeting resource reference may represent an address (or a location on a computer network) (e.g., a uniform resource locator or URL) where at a shared data repository associated with the created asynchronous meeting may reside. The shared data repository may refer to a dedicated, virtual data storage space on the collaboration platform service wherein information (e.g., the initial meeting content and/or user contribution(s) (obtained in Step 308), future user contribution(s) by the users of the session/meeting organizer and the non-session/meeting organizer(s), etc.) pertinent to the created asynchronous meeting may be stored and accessed from. Thereafter, in Step 314, the meeting resource reference (received in Step 312) is shared with the one or more non-session/meeting organizers (or user(s) thereof).

In Step 316, one or more user contributions (described above), from the user of the session/meeting organizer and pertinent to the asynchronous meeting (created in Step 300), is/are obtained. The user contribution(s) (or at least a portion thereof) may or may not include, or may or may not have been conceived or influenced by, information captured by and/or derived (or inferred) from the meeting-relevant reference(s) and/or the meeting-relevant recommendation(s) (received in Step 304 or Step 324 (described below)).

Turning to FIG. 3B, in Step 320, user-specific meeting context is derived (or inferred) from the user contribution(s) (obtained in Step 316). In one embodiment of the invention, the user-specific meeting context may encompass any contextual information pertinent to the collaborative discussion, topic, or focus of the created asynchronous meeting (or meeting series thereof), which may reflect the intent, agenda, concern, cognitive process, or engagement associated with a particular meeting participant towards at least a portion of the meeting content. Examples of user-specific meeting context may include, but are not limited to: meeting notes and/or minutes from previously conducted asynchronous meetings of the meeting series, which may have been contributed by or directed to a given meeting participant; meeting conversations or dialogues involving the given meeting participant; and inferred themes or topics of interest (or of relevance) to the given meeting participant.

In Step 322, the user contribution(s) (obtained in Step 316) and the user-specific meeting context (derived in Step 320) are subsequently submitted to the collaboration platform service. In turn, in one embodiment of the invention, the collaboration platform service may use the aforementioned submission (or at least a portion thereof) to at least update or maintain one or more meeting management structures (described above) (see e.g., FIGS. 2A-2C). In another embodiment of the invention, where the created asynchronous meeting associates with a meeting series, the collaboration platform service may further use the aforementioned submission (or at least a portion thereof), in conjunction with archived meeting assets (described above) (see e.g., FIG. 2A) of past asynchronous meetings of the meeting series, to retrieve one or more meeting-relevant references and/or derive (or infer) one or more meeting-relevant recommendations.

Hereinafter, in one embodiment of the invention, if the meeting configuration (submitted in Step 302) specified a meeting series ID, then the process proceeds to Step 324. On the other hand, in another embodiment of the invention, if the aforementioned meeting configuration excluded a meeting series ID, then the process alternatively proceeds to Step 328.

In Step 324, one or more meeting-relevant references and/or one or more meeting-relevant recommendations (described and exemplified above) is/are received from the collaboration platform service. Thereafter, in Step 326, the meeting-relevant reference(s) and/or the meeting-relevant recommendation(s) (received in Step 324) is/are presented to the user of the meeting organizer for consideration.

In Step 328, a determination is made as to whether the window closure criterion or criteria, for the asynchronous meeting (created in Step 300), has been met. By way of an example, the window closure criterion/criteria may be time-based—e.g., may indicate a window termination timestamp (or a specified time period following the window activation timestamp) at which the created asynchronous meeting may be set to end. By way of another example, the window closure criterion/criteria may be contribution-based—e.g., may specify the number of rounds (or cycles) of user contribution(s), from each meeting participant, which should be applied throughout the created asynchronous meeting. Other window closure criterion/criteria may be employed without departing from the scope of the invention.

Accordingly, in one embodiment of the invention, if it is determined that the window closure criterion/criteria, for the asynchronous meeting (created in Step 300), has been met, then the process proceeds to Step 330. On the other hand, in another embodiment of the invention, if it is alternatively determined that the window closure criterion/criteria has not been met, then the process alternatively proceeds to Step 316, where one or more additional user contributions, from the user of the session/meeting organizer and pertinent to the created asynchronous meeting, is/are obtained.

In Step 330, following the determination (in Step 328) that the window closure criterion/criteria, for the asynchronous meeting (created in Step 300), has been met, and thereby, following the runtime termination of the created asynchronous meeting, meeting collateral is received from the collaboration platform service. In one embodiment of the invention, meeting collateral may represent key meeting-relevant information generated following the closure of an asynchronous meeting information. Examples of meeting collateral may include, but are not limited to: meeting summaries or notes concisely describing events that had transpired within the intra-window state of the asynchronous meeting, one or more action items assigned to one or more session/meeting participants following the asynchronous meeting, and consensus(es) reached amongst the session/meeting participants during the asynchronous meeting.

Figure 4A:
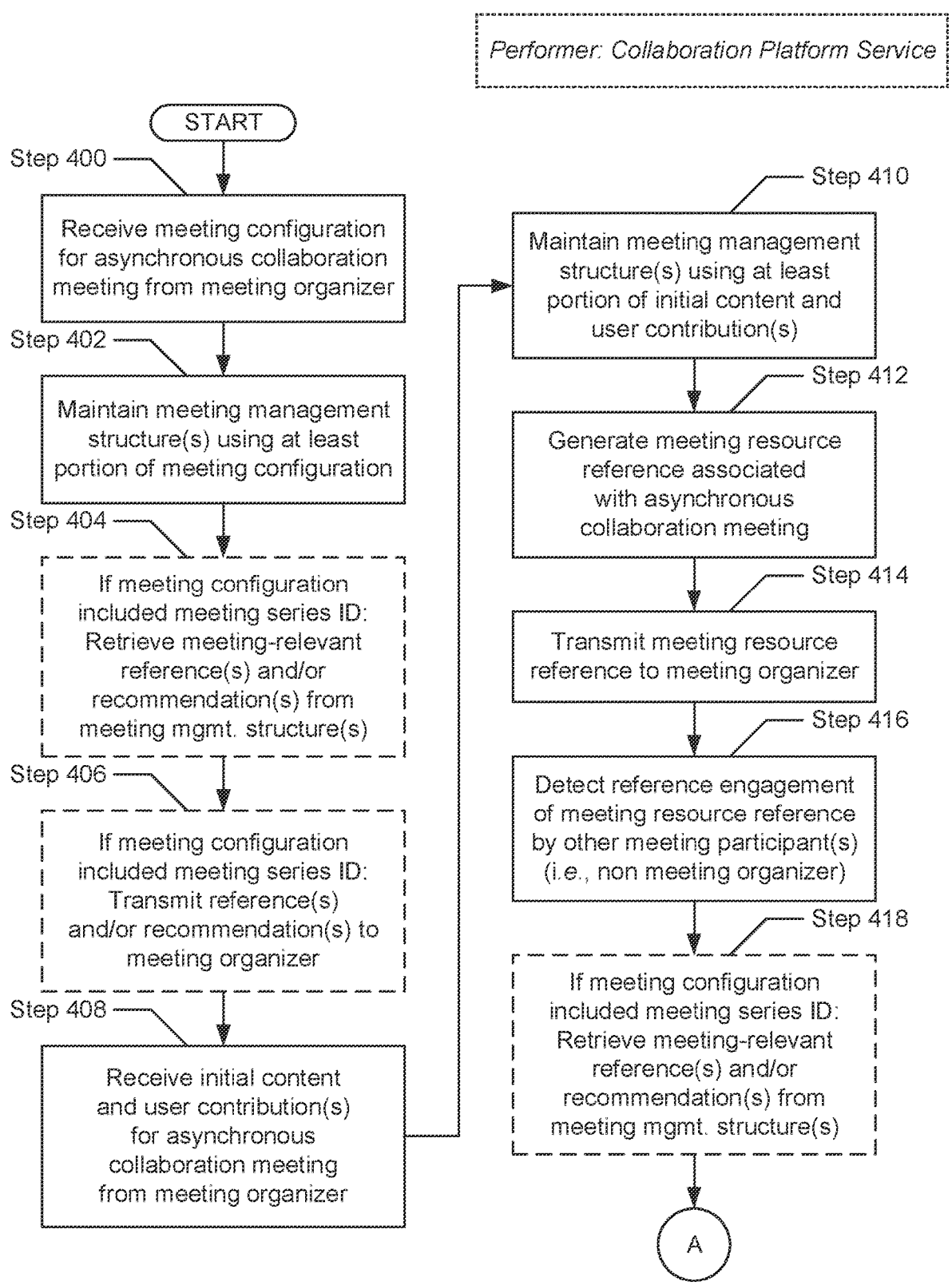
FIGS. 4A-4C show flowcharts describing a method for asynchronous meeting management in accordance with one or more embodiments of the invention.
Figure 4B:
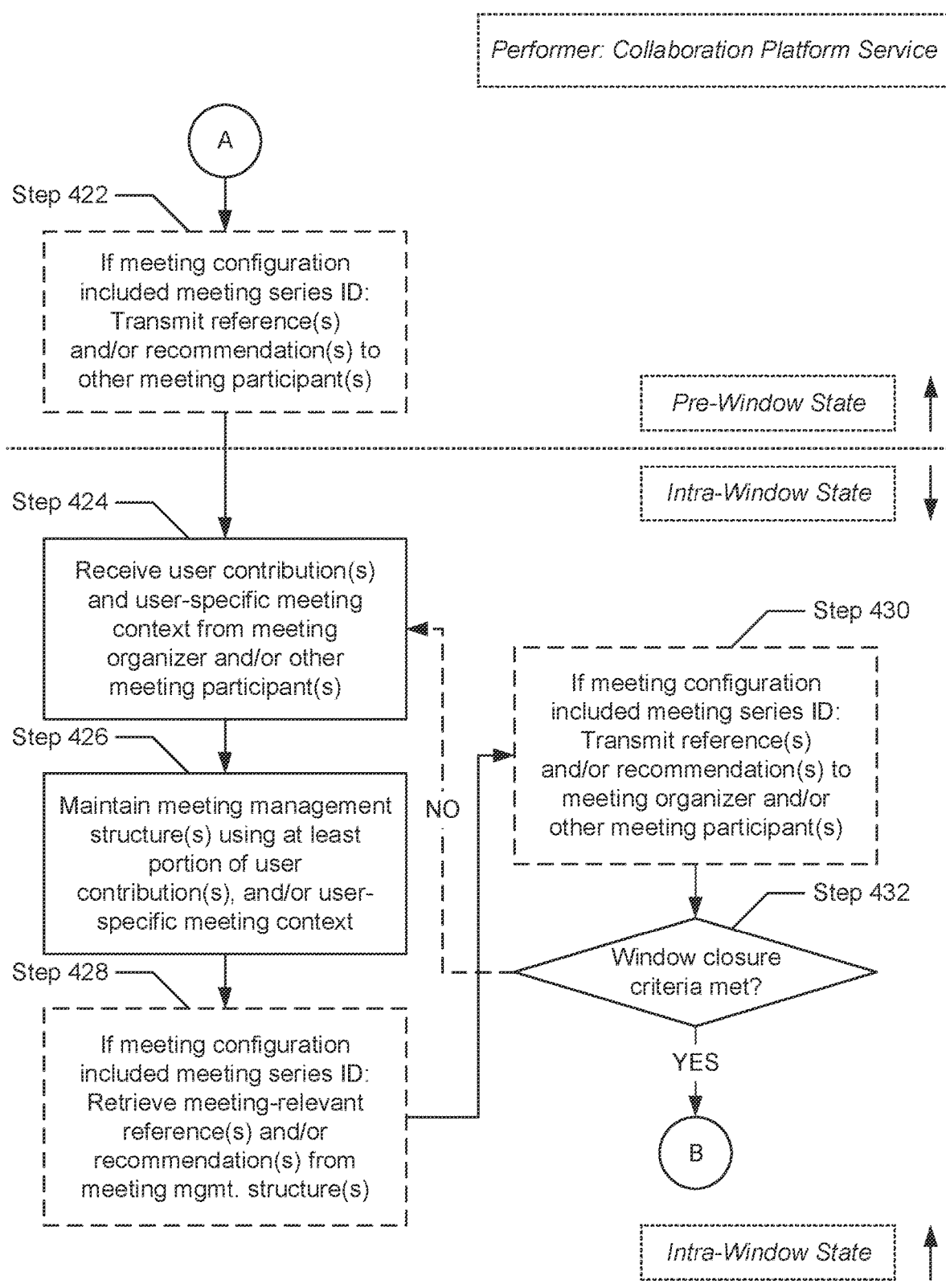
Figure 4C:
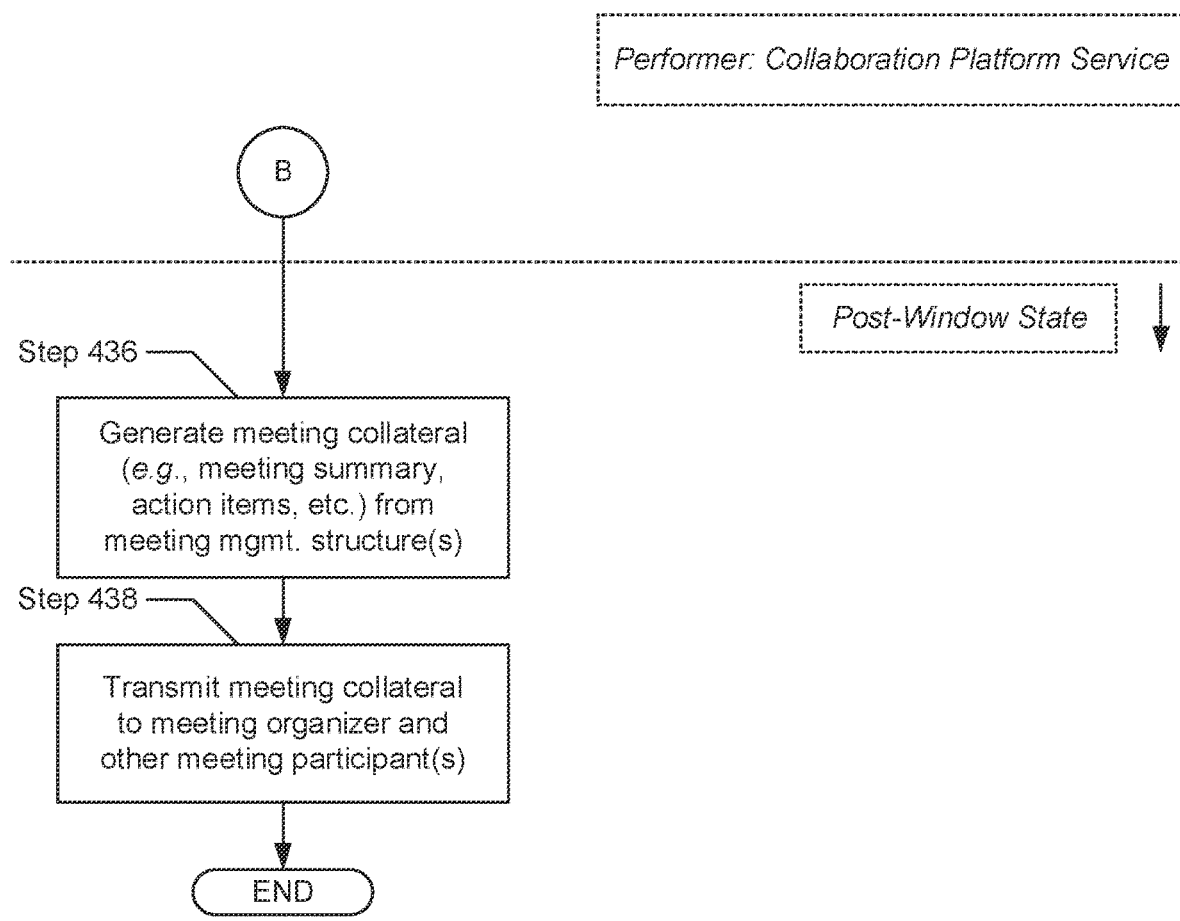

FIGS. 4A-4C show flowcharts describing a method for asynchronous meeting management in accordance with one or more embodiments of the invention. The various steps outlined below may be performed by the collaboration platform service (described above) (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 4A, in Step 400, a meeting configuration, associated with a created asynchronous meeting, is received from a session/meeting organizer (described above) (see e.g., FIG. 1). Generally, in one embodiment of the invention, an asynchronous meeting may refer to a collaboration session, amongst local (i.e., co-located) and/or remote (i.e., physically distant) collaborators, which may transpire or may be conducted asynchronously (i.e., not in real-time). Further, creation of the asynchronous meeting may be defined through the meeting configuration—parameters of which may have been selected by a user of the session/meeting organizer, or generated by the session/meeting organizer Examples of the aforementioned parameters may include, but are not limited to: a list of meeting participants (i.e., the user of the session/meeting organizer and the user(s) of at least one non-session/meeting organizer); a meeting identifier (ID) assigned to the created asynchronous meeting; a meeting series ID assigned to an asynchronous meeting series (or a collection of related asynchronous meetings) with which the created asynchronous meeting may be associated (note: should the created asynchronous meeting represent a first of such related asynchronous meetings, then the meeting series ID may not be provided in the meeting configuration); a window activation timestamp referencing a prospective date and/or time at which the created asynchronous meeting is set to commence; and a window closure criterion (or criteria) describing one or more conditions or rules, which may mark a termination of the created asynchronous meeting.

In Step 402, one or more meeting management structures (see e.g., FIGS. 2A-2C) is/are maintained (i.e., updated) using the meeting configuration (or at least a portion thereof) (received in Step 400). In one embodiment of the invention, a meeting management structure may refer to a data object or data structure employed to facilitate management (i.e., organization, consolidation, and access) of one or more aspects (or domains) of one or many asynchronous meeting(s) (or meeting series thereof). Examples of the aforementioned aspects (or domains), which may be managed for any given asynchronous meeting (or meeting series thereof), may include, but are not limited to: meeting assets pertaining to the given asynchronous meeting (or meeting series thereof); a meeting lifecycle describing the given asynchronous meeting (or meeting series thereof); and meeting participants or users associated with the given asynchronous meeting (or meeting series thereof). Meeting assets, the meeting lifecycle, and meeting participants/users are all described in further detail in FIGS. 2A-2C, above, respectively.

Hereinafter, in one embodiment of the invention, if the meeting configuration (received in Step 400) specified a meeting series ID, then the process proceeds to Step 404. On the other hand, in another embodiment of the invention, if the aforementioned meeting configuration excluded a meeting series ID, then the process alternatively proceeds to Step 408.

In Step 404, one or more meeting-relevant references is/are retrieved from the meeting management structure(s) (maintained in Step 402). In one embodiment of the invention, a meeting-relevant reference may encompass a meeting asset (described above) (see e.g., FIG. 2A) associated with any given past (or previously conducted) asynchronous meeting pertaining to the asynchronous meeting series to which the created asynchronous meeting belongs. Examples of a meeting-relevant reference may include, but are not limited to: any form of meeting-pertinent user contribution(s) (e.g., video and/or audio recording(s) capturing user dialogue expressed during the pre-window and intra-window states of the given past asynchronous meeting, text-based user inputs such as comments, edits, and/or questions, etc.); meeting content—e.g., shared electronic text document, electronic slide presentation, multi-media, etc.—representative of the meeting-pertinent discussion, topic, or focus; and meeting collateral (e.g., a meeting summary or set of notes concisely describing events that had transpired within the intra-window state of the given past asynchronous meeting, one or more action items assigned to one or more session/meeting participants following the given past asynchronous meeting, consensus(es) reached amongst the session/meeting participants during the given past asynchronous meeting, etc.).

Furthermore, in one embodiment of the invention, one or more meeting-relevant recommendations is/are derived (or inferred) from the meeting management structure(s) (maintained in Step 402). A meeting-relevant recommendation may encompass a course of action—suggestive, disciplinary, or otherwise—put forth by the collaboration platform service, which may facilitate team cohesion, alignment, churn, and/or efficiency management. Through said management, consensus, amongst the list of meeting participants, concerning the collaborative discussion, topic, or focus, may be achieved and enforced. For example, should a meeting participant fail to remember any consensus reached amongst the list of meeting participants during any past asynchronous meeting of the asynchronous meeting series, or persists to push an agenda contradictive to any reached consensus established in any past asynchronous meeting of the asynchronous meeting series, a meeting-relevant recommendation may be relayed to the meeting participant, which would propose that they take action to conform to the consensus. Consensus violations (as well as meeting-relevant recommendations pertinent thereto) may be detected based on user intent derivations (or inferences) attained via artificial intelligence and/or machine learning analysis of past asynchronous meeting collateral (described above) (see e.g., FIG. 2A), meeting content (described above) (see e.g., FIG. 2A), user contributions (described above) (see e.g., FIG. 2A), and/or user-specific meeting context (described below).

In Step 406, the meeting-relevant reference(s) and/or the meeting-relevant recommendation(s) (retrieved/inferred in Step 304) is/are transmitted to the session/meeting organizer.

In Step 408, initial meeting content, pertinent to the created asynchronous meeting, is obtained from the session/meeting organizer. In one embodiment of the invention, the initial meeting content may refer to one or more forms of information, which may facilitate the collaborative discussion, topic, and/or focus of the created asynchronous meeting. By way of examples, the initial meeting content may include, but is not limited to, one or more electronic text documents, one or more electronic slide presentations, one or more electronic images, one or more animations, one or more videos, any other electronic multi-media, or any combination thereof. The initial meeting content (or at least a portion thereof) may or may not include, or may or may not have been conceived or influenced by, information captured by and/or derived (or inferred) from the meeting-relevant reference(s) and/or the meeting-relevant recommendation(s) (transmitted in Step 406).

Furthermore, in one embodiment of the invention, one or more user contributions, pertinent to the created asynchronous meeting, is/are also received from the session/meeting organizer A user contribution may encompass any authorized form of adjustment (or manipulation)—e.g., amendment, edit, deletion, correction, insertion, etc.—to meeting content or information co-created by any subset or all of the list of participants, and reflective of the collaborative discussion, topic, or focus. Other than direct changes to the meeting content (or co-created information), user contributions may also include, but are not limited to, comments, tags, questions, and other forms of electronic documentation that can be applied to or associated with the meeting content (or co-created information). The user contribution(s) (or at least a portion thereof) may or may not include, or may or may not have been conceived or influenced by, information captured by and/or derived (or inferred) from the meeting-relevant reference(s) and/or the meeting-relevant recommendation(s) (transmitted in Step 406).

In Step 410, one or more meeting management structures (described above) is/are maintained using the initial meeting content (or at least a portion thereof) and/or the user contribution(s) (or at least a portion thereof) (received in Step 408).

In Step 412, a meeting resource reference, associated with the created asynchronous meeting, is generated. In one embodiment of the invention, the meeting resource reference may represent an address (or a location on a computer network) (e.g., a uniform resource locator or URL) where at a shared data repository associated with the created asynchronous meeting may reside. The shared data repository may refer to a dedicated, virtual data storage space on the collaboration platform service wherein information (e.g., the initial meeting content and/or user contribution(s) (received in Step 408), future user contribution(s) received from the session/meeting organizer and the non-session/meeting organizer(s), etc.) pertinent to the created asynchronous meeting may be stored and accessed from. Thereafter, in Step 414, the meeting resource reference (generated in Step 412) is transmitted to the session/meeting organizer.

In Step 416, one or more engagements (or reference engagements) of the meeting resource reference (transmitted in Step 414) is/are detected. Specifically, in one embodiment of the invention, a detected reference engagement may entail the receipt of the submission of an access request, to the above-mentioned shared data repository associated with the created asynchronous meeting, from a given non-session/meeting organizer. The access request may further serve to confirm the participation of the given non-session/meeting organizer in the created asynchronous meeting.

Hereinafter, in one embodiment of the invention, if the meeting configuration (received in Step 400) specified a meeting series ID, then the process proceeds to Step 418. On the other hand, in another embodiment of the invention, if the aforementioned meeting configuration excluded a meeting series ID, then the process alternatively proceeds to Step 424 (see e.g., FIG. 4B).

In Step 418, one or more meeting-relevant references and/or one or more meeting-relevant recommendations (described and exemplified above) is/are retrieved/inferred from the meeting management structure(s) (maintained in Step 410).

Turning to FIG. 4B, in Step 422, the meeting-relevant reference(s) and/or the meeting-relevant recommendation(s) (retrieved/inferred in Step 418) (see e.g., FIG. 4A) is/are transmitted to the non-session/meeting organizer(s) (whom which engaged with the meeting resource reference transmitted in Step 414).

In Step 424, one or more user contributions (described above), pertinent to the created asynchronous meeting, is/are received from the session/meeting organizer and/or any subset or all of the non-session/meeting organizer(s). Additionally, or alternatively, user-specific meeting context, from any of the aforementioned entities, may be received. In one embodiment of the invention, the user-specific meeting context may encompass any contextual information pertinent to the collaborative discussion, topic, or focus of the created asynchronous meeting (or meeting series thereof), which may reflect the intent, agenda, concern, cognitive process, or engagement associated with a particular meeting participant towards at least a portion of the meeting content. Examples of user-specific meeting context may include, but are not limited to: meeting notes and/or minutes from previously conducted asynchronous meetings of the meeting series, which may have been contributed by or directed to a given meeting participant; meeting conversations or dialogues involving the given meeting participant; and inferred themes or topics of interest (or of relevance) to the given meeting participant. The received user contribution(s) (or at least a portion thereof), and/or the received user-specific meeting context, may or may not include, or may or may not have been conceived or influenced by, information captured by and/or derived (or inferred) from the meeting-relevant reference(s) and/or the meeting-relevant recommendation(s) (transmitted in Step 422 or Step 430 (described below)).

In Step 426, one or more meeting management structures (described above) are maintained (i.e., updated) using the user contribution(s) (or at least a portion thereof) and/or the user-specific meeting context (or at least a portion thereof) (received in Step 424).

Hereinafter, in one embodiment of the invention, if the meeting configuration (received in Step 400) specified a meeting series ID, then the process proceeds to Step 428. On the other hand, in another embodiment of the invention, if the aforementioned meeting configuration excluded a meeting series ID, then the process alternatively proceeds to Step 432.

In Step 428, one or more meeting-relevant references and/or one or more meeting-relevant recommendations (described and exemplified above) is/are retrieved/inferred from the meeting management structure(s) (maintained in Step 426). Subsequently, in Step 430, the meeting-relevant reference(s) and/or the meeting-relevant recommendation(s) (retrieved/inferred in Step 426) is/are transmitted to the session/meeting organizer and/or the non-session/meeting organizer(s) (from whom user contribution(s) and/or user-specific meeting context had been received in Step 424).

In Step 432, a determination is made as to whether the window closure criterion or criteria, for the created asynchronous meeting, has been met. By way of an example, the window closure criterion/criteria may be time-based—e.g., may indicate a window termination timestamp (or a specified time period following the window activation timestamp) at which the created asynchronous meeting may be set to end. By way of another example, the window closure criterion/criteria may be contribution-based—e.g., may specify the number of rounds (or cycles) of user contribution(s), from each meeting participant, which should be applied throughout the created asynchronous meeting. Other window closure criterion/criteria may be employed without departing from the scope of the invention.

Accordingly, in one embodiment of the invention, if it is determined that the window closure criterion/criteria, for the created asynchronous meeting, has been met, then the process proceeds to Step 436 (see e.g., FIG. 4C). On the other hand, in another embodiment of the invention, if it is alternatively determined that the window closure criterion/criteria has not been met, then the process alternatively proceeds to Step 424, where additional user contribution(s) and/or user-specific meeting context, pertinent to the created asynchronous meeting, is/are received from the session/meeting organizer and/or any subset or all of the non-session/meeting organizer(s).

Turning to FIG. 4C, in Step 436, following the determination (in Step 432) that the window closure criterion/criteria, for the created asynchronous meeting, has been met, and thereby, following the runtime termination of the created asynchronous meeting, meeting collateral is generated from the meeting management structure(s) (maintained in Step 426). In one embodiment of the invention, meeting collateral may represent key meeting-relevant information generated following the closure of an asynchronous meeting. Examples of meeting collateral may include, but are not limited to: meeting summaries or notes concisely describing events that had transpired within the intra-window state of the asynchronous meeting, one or more action items assigned to one or more session/meeting participants following the asynchronous meeting, and consensus(es) reached amongst the session/meeting participants during the asynchronous meeting.

Lastly, in Step 438, the meeting collateral (generated in Step 438) is transmitted to the session/meeting organizer and each non-session/meeting organizer. Further, in one embodiment of the invention, the meeting collateral may be consolidated in, and thus used to further maintain (or update), one or more of the meeting management structures (see e.g., FIGS. 2A-2C).

Figure 5A:
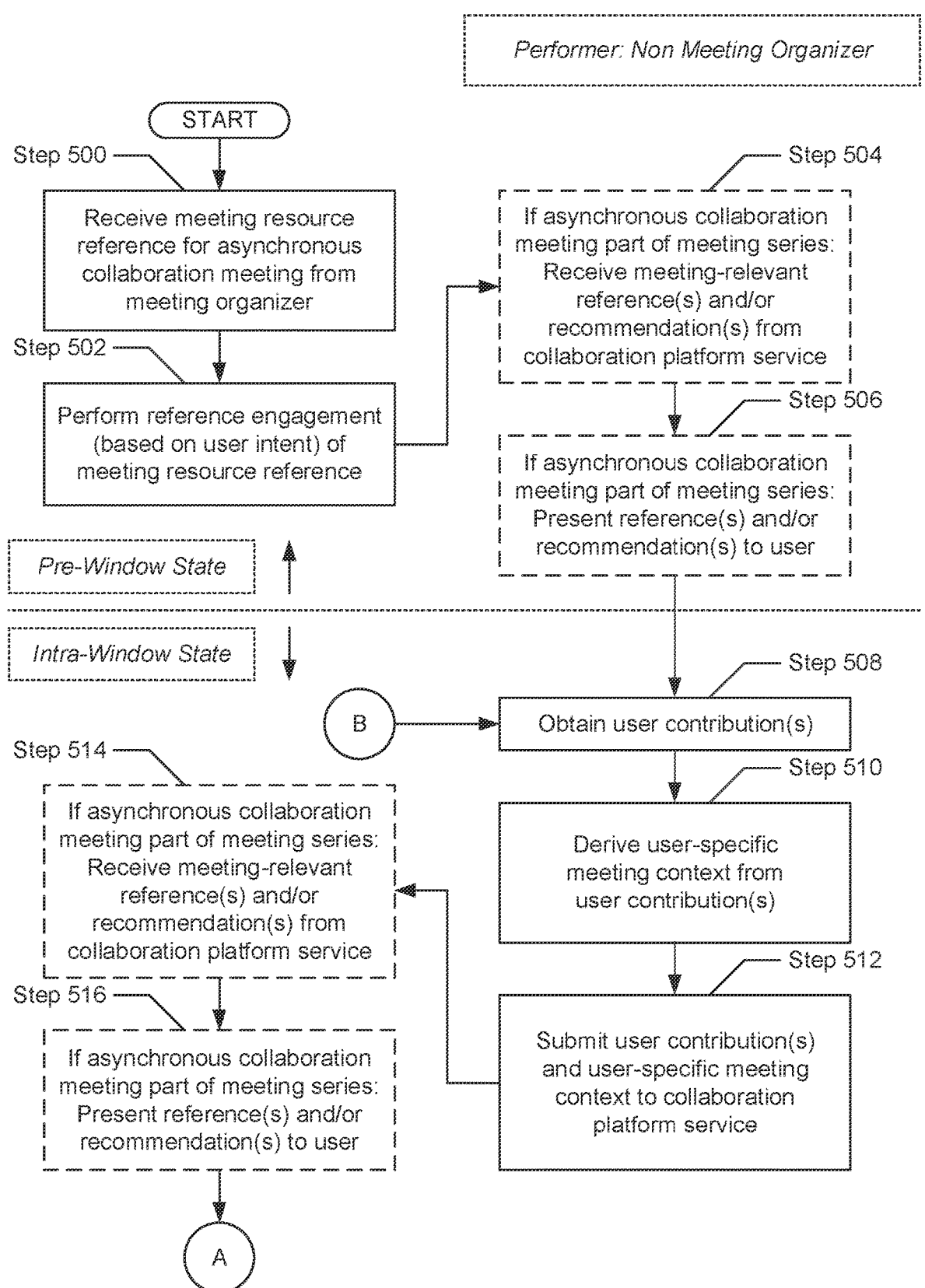
FIGS. 5A and 5B show flowcharts describing a method for asynchronous meeting participation in accordance with one or more embodiments of the invention.
Figure 5B:
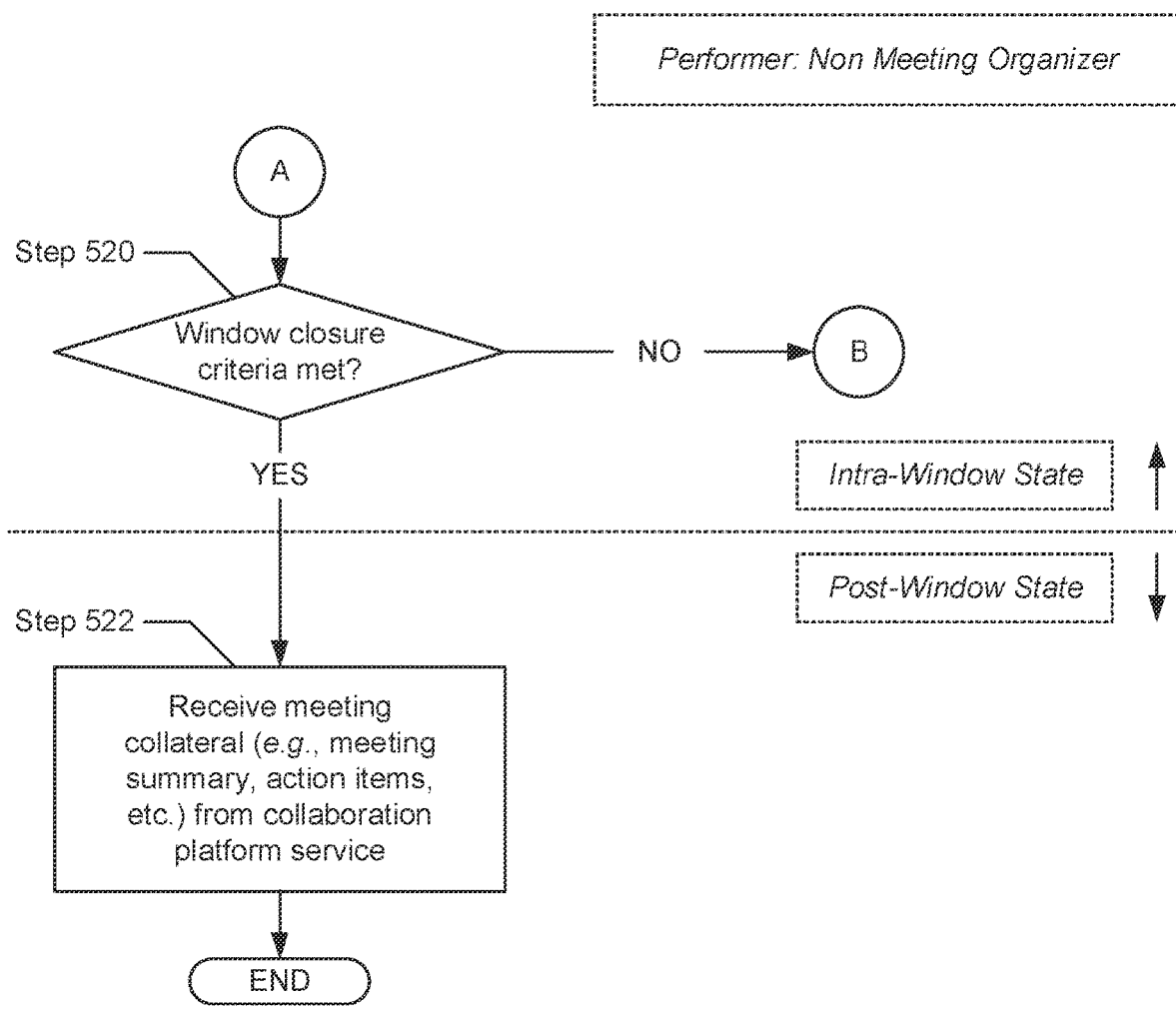

FIGS. 5A and 5B show flowcharts describing a method for asynchronous meeting participation in accordance with one or more embodiments of the invention. The various steps outlined below may be performed by any non-session/meeting organizer (described above) (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 5A, in Step 500, a meeting resource reference, associated with a created asynchronous meeting, is received from a session/meeting organizer Generally, in one embodiment of the invention, an asynchronous meeting may refer to a collaboration session, amongst local (i.e., co-located) and/or remote (i.e., physically distant) collaborators, which may transpire or may be conducted asynchronously (i.e., not in real-time). Further, the meeting resource reference may represent an address (or a location on a computer network) (e.g., a uniform resource locator or URL) where at a shared data repository associated with the created asynchronous meeting may reside. The shared data repository may refer to a dedicated, virtual data storage space on the collaboration platform service (see e.g., FIG. 1) wherein information (e.g., meeting content and/or past and future user contribution(s) from the session/meeting organizer and the non-session/meeting organizer(s), etc.) pertinent to the created asynchronous meeting may be stored and accessed from.

In Step 502, an engagement (or reference engagement) of the meeting resource reference (received in Step 500) is performed. Specifically, in one embodiment of the invention, a reference engagement may entail the submission of an access request, to the above-mentioned shared data repository associated with the created asynchronous meeting, which may be directed to the collaboration platform service. The access request may further serve to confirm the participation of the non-session/meeting organizer (or the user thereof) in the created asynchronous meeting.

Hereinafter, in one embodiment of the invention, if the created asynchronous meeting (mentioned in Step 500) links to an asynchronous meeting series, then the process proceeds to Step 504. On the other hand, in another embodiment of the invention, if the created asynchronous meeting does not link to an asynchronous meeting series, then the process alternatively proceeds to Step 508.

In Step 504, one or more meeting-relevant references is/are received from the collaboration platform service. In one embodiment of the invention, a meeting-relevant reference may encompass a meeting asset (described above) (see e.g., FIG. 2A) associated with any given past (or previously conducted) asynchronous meeting pertaining to the asynchronous meeting series to which the created asynchronous meeting belongs. Examples of a meeting-relevant reference may include, but are not limited to: any form of meeting-pertinent user contribution(s) (e.g., video and/or audio recording(s) capturing user dialogue expressed during the pre-window and intra-window states of the given past asynchronous meeting, text-based user inputs such as comments, edits, and/or questions, etc.); meeting content—e.g., shared electronic text document, electronic slide presentation, multi-media, etc.—representative of the meeting-pertinent discussion, topic, or focus; and meeting collateral (e.g., a meeting summary or set of notes concisely describing events that had transpired within the intra-window state of the given past asynchronous meeting, one or more action items assigned to one or more session/meeting participants following the given past asynchronous meeting, consensus(es) reached amongst the session/meeting participants during the given past asynchronous meeting, etc.).

Furthermore, in one embodiment of the invention, one or more meeting-relevant recommendations is/are also received from the collaboration platform service. A meeting-relevant recommendation may encompass a course of action—suggestive, disciplinary, or otherwise—put forth by the collaboration platform service, which may facilitate team cohesion, alignment, churn, and/or efficiency management. Through said management, consensus, amongst the list of meeting participants, concerning the collaborative discussion, topic, or focus, may be achieved and enforced. For example, should a meeting participant fail to remember any consensus reached amongst the list of meeting participants during any past asynchronous meeting of the asynchronous meeting series, or persists to push an agenda contradictive to any reached consensus established in any past asynchronous meeting of the asynchronous meeting series, a meeting-relevant recommendation may be relayed to the meeting participant, which would propose that they take action to conform to the consensus. Consensus violations (as well as meeting-relevant recommendations pertinent thereto) may be detected based on user intent derivations (or inferences) attained via artificial intelligence and/or machine learning analysis of past asynchronous meeting collateral (described above) (see e.g., FIG. 2A), meeting content (described above) (see e.g., FIG. 2A), user contributions (described above) (see e.g., FIG. 2A), and/or user-specific meeting context (described below).

In Step 506, the meeting-relevant reference(s) and/or the meeting-relevant recommendation(s) (received in Step 504) is/are presented to the user of the non-session/meeting organizer for consideration.

In Step 508, one or more user contributions, pertinent to the created asynchronous meeting, is/are also obtained from the user of the non-session/meeting organizer A user contribution may encompass any authorized form of adjustment (or manipulation)—e.g., amendment, edit, deletion, correction, insertion, etc.—to meeting content or information co-created by any subset or all of the list of participants, and reflective of the collaborative discussion, topic, or focus. Other than direct changes to the meeting content (or co-created information), user contributions may also include, but are not limited to, comments, tags, questions, and other forms of electronic documentation that can be applied to or associated with the meeting content (or co-created information). Further, the user contribution(s) (or at least a portion thereof) may or may not include, or may or may not have been conceived or influenced by, information captured by and/or derived (or inferred) from the meeting-relevant reference(s) and/or the meeting-relevant recommendation(s) (received in Step 504 or Step 514 (described below)).

In Step 510, user-specific meeting context is derived (or inferred) from the user contribution(s) (obtained in Step 508). In one embodiment of the invention, the user-specific meeting context may encompass any contextual information pertinent to the collaborative discussion, topic, or focus of the created asynchronous meeting (or meeting series thereof), which may reflect the intent, agenda, concern, cognitive process, or engagement associated with a particular meeting participant towards at least a portion of the meeting content. Examples of user-specific meeting context may include, but are not limited to: meeting notes and/or minutes from previously conducted asynchronous meetings of the meeting series, which may have been contributed by or directed to a given meeting participant; meeting conversations or dialogues involving the given meeting participant; and inferred themes or topics of interest (or of relevance) to the given meeting participant.

In Step 512, the user contribution(s) (obtained in Step 508) and the user-specific meeting context (derived in Step 510) are subsequently submitted to the collaboration platform service. In turn, in one embodiment of the invention, the collaboration platform service may use the aforementioned submission (or at least a portion thereof) to at least update or maintain one or more meeting management structures (described above) (see e.g., FIGS. 2A-2C). In another embodiment of the invention, where the created asynchronous meeting associates with a meeting series, the collaboration platform service may further use the aforementioned submission (or at least a portion thereof), in conjunction with archived meeting assets (described above) (see e.g., FIG. 2A) of past asynchronous meetings of the meeting series, to retrieve one or more meeting-relevant references and/or derive (or infer) one or more meeting-relevant recommendations.

Hereinafter, in one embodiment of the invention, if the created asynchronous meeting (mentioned in Step 500) links to an asynchronous meeting series, then the process proceeds to Step 514. On the other hand, in another embodiment of the invention, if the created asynchronous meeting does not link to an asynchronous meeting series, then the process alternatively proceeds to Step 520 (see e.g., FIG. 5B).

In Step 514, one or more meeting-relevant references and/or one or more meeting-relevant recommendations (described and exemplified above) is/are received from the collaboration platform service. Thereafter, in Step 516, the meeting-relevant reference(s) and/or the meeting-relevant recommendation(s) (received in Step 514) is/are presented to the user of the non-session/meeting organizer for consideration.

Turning to FIG. 5B, in Step 520, a determination is made as to whether the window closure criterion or criteria, for the created asynchronous meeting, has been met. By way of an example, the window closure criterion/criteria may be time-based—e.g., may indicate a window termination timestamp (or a specified time period following the window activation timestamp) at which the created asynchronous meeting may be set to end. By way of another example, the window closure criterion/criteria may be contribution-based—e.g., may specify the number of rounds (or cycles) of user contribution(s), from each meeting participant, which should be applied throughout the created asynchronous meeting. Other window closure criterion/criteria may be employed without departing from the scope of the invention.

Accordingly, in one embodiment of the invention, if it is determined that the window closure criterion/criteria, for the created asynchronous meeting, has been met, then the process proceeds to Step 522. On the other hand, in another embodiment of the invention, if it is alternatively determined that the window closure criterion/criteria has not been met, then the process alternatively proceeds to Step 508, where one or more additional user contributions, from the user of the non-session/meeting organizer and pertinent to the created asynchronous meeting, is/are obtained.

In Step 522, following the determination (in Step 520) that the window closure criterion/criteria, for the created asynchronous meeting, has been met, and thereby, following the runtime termination of the created asynchronous meeting, meeting collateral is received from the collaboration platform service. In one embodiment of the invention, meeting collateral may represent key meeting-relevant information generated following the closure of an asynchronous meeting. Examples of meeting collateral may include, but are not limited to: meeting summaries or notes concisely describing events that had transpired within the intra-window state of the asynchronous meeting, one or more action items assigned to one or more session/meeting participants following the asynchronous meeting, and consensus(es) reached amongst the session/meeting participants during the asynchronous meeting.

Figure 6:
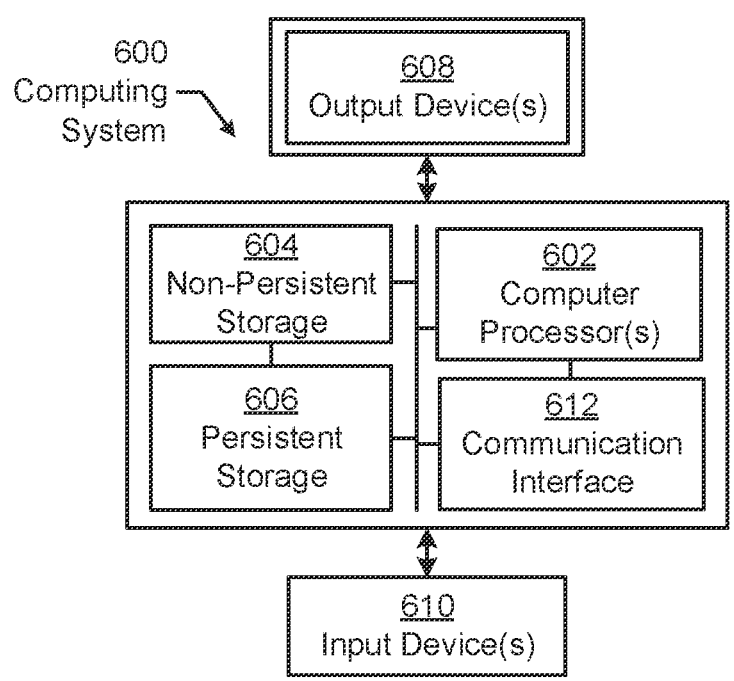
FIG. 6 shows an exemplary computing system in accordance with one or more embodiments of the invention.

FIG. 6 shows an exemplary computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a central processing unit (CPU) and/or a graphics processing unit (GPU). The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for asynchronous meeting management, comprising:
performing, by a collaboration platform service and until a window closure criterion for an asynchronous meeting is met, an iterative process, comprising:
receiving user-specific meeting context from one selected from a group consisting of a meeting organizer and a non-meeting organizer, of the asynchronous meeting;
maintaining a meeting management structure using at least a portion of the user-specific meeting context;
inferring a meeting-relevant recommendation from at least a portion of the meeting management structure; and
transmitting the meeting-relevant recommendation to the one selected from the group consisting of the meeting organizer and the non-meeting organizer, of the asynchronous meeting.

2. The method of claim 1, wherein the user-specific context comprises contextual information pertinent to the asynchronous meeting that is relevant to a user of the one selected from the group consisting of the meeting organizer and the non-meeting organizer.

3. The method of claim 1, wherein the meeting management structure represents a data structure employed to facilitate management of at least one aspect of the asynchronous meeting, wherein the at least one aspect comprises a set of meeting assets.

4. The method of claim 1, wherein the meeting-relevant recommendation comprises a course of action intended to facilitate cohesion amongst users of the meeting organizer and the non-meeting organizer, of the asynchronous meeting.

5. The method of claim 1, wherein the window closure criterion for the asynchronous meeting comprises one selected from a group consisting of a time-based criterion and a contribution-based criterion.

6. The method of claim 1, wherein a user contribution is further received from the one selected from the group consisting of the meeting organizer and the non-meeting organizer, of the asynchronous meeting, wherein the meeting management structure is further maintained using at least a portion of the user contribution, and wherein the user contribution comprises an adjustment to meeting content, of the asynchronous meeting, co-created by users of the meeting organizer and the non-meeting organizer.

7. The method of claim 6, wherein at least one selected from a group consisting of the user-specific meeting context and the user contribution, comprises information conveyed in the meeting-relevant recommendation.

8. The method of claim 7, wherein a meeting-relevant reference is further retrieved from at least another portion of the meeting management structure, wherein the meeting-relevant reference is also transmitted to the one selected from the group consisting of the meeting organizer and the non-meeting organizer, of the asynchronous meeting, and wherein the meeting-relevant reference comprises a meeting asset associated with a past asynchronous meeting in a meeting series linked to the asynchronous meeting.

9. The method of claim 8, wherein the at least one selected from the group consisting of the user-specific meeting context and the user contribution, further comprises information conveyed in the meeting-relevant reference.

10. The method of claim 1, further comprising:
performing, by the collaboration platform service and upon meeting the window closure criterion for the asynchronous meeting, a non-iterative process, comprising:
- generating, based on the meeting management structure, meeting collateral associated with the asynchronous meeting; and
- transmitting the meeting collateral to the meeting organizer and the non-meeting organizer.

11. A non-transitory computer readable medium (CRM) comprising computer readable program code, which when executed by a computer processor, enables the computer processor to perform a method for asynchronous meeting management, the method comprising:
performing, by a collaboration platform service and until a window closure criterion for an asynchronous meeting is met, an iterative process, comprising:
- receiving user-specific meeting context from one selected from a group consisting of a meeting organizer and a non-meeting organizer, of the asynchronous meeting;
- maintaining a meeting management structure using at least a portion of the user-specific meeting context;
- inferring a meeting-relevant recommendation from at least a portion of the meeting management structure; and
- transmitting the meeting-relevant recommendation to the one selected from the group consisting of the meeting organizer and the non-meeting organizer, of the asynchronous meeting.

12. The non-transitory CRM of claim 11, wherein the user-specific context comprises contextual information pertinent to the asynchronous meeting that is relevant to a user of the one selected from the group consisting of the meeting organizer and the non-meeting organizer.

13. The non-transitory CRM of claim 11, wherein the meeting management structure represents a data structure employed to facilitate management of at least one aspect of the asynchronous meeting, wherein the at least one aspect comprises a set of meeting assets.

14. The non-transitory CRM of claim 11, wherein the meeting-relevant recommendation comprises a course of action intended to facilitate cohesion amongst users of the meeting organizer and the non-meeting organizer, of the asynchronous meeting.

15. The non-transitory CRM of claim 11, wherein the window closure criterion for the asynchronous meeting comprises one selected from a group consisting of a time-based criterion and a contribution-based criterion.

16. The non-transitory CRM of claim 11, wherein a user contribution is further received from the one selected from the group consisting of the meeting organizer and the non-meeting organizer, of the asynchronous meeting, wherein the meeting management structure is further maintained using at least a portion of the user contribution, and wherein the user contribution comprises an adjustment to meeting content, of the asynchronous meeting, co-created by users of the meeting organizer and the non-meeting organizer.

17. The non-transitory CRM of claim 16, wherein at least one selected from a group consisting of the user-specific meeting context and the user contribution, comprises information conveyed in the meeting-relevant recommendation.

18. The non-transitory CRM of claim 17, wherein a meeting-relevant reference is further retrieved from at least another portion of the meeting management structure, wherein the meeting-relevant reference is also transmitted to the one selected from the group consisting of the meeting organizer and the non-meeting organizer, of the asynchronous meeting, and wherein the meeting-relevant reference comprises a meeting asset associated with a past asynchronous meeting in a meeting series linked to the asynchronous meeting.

19. The non-transitory CRM of claim 18, wherein the at least one selected from the group consisting of the user-specific meeting context and the user contribution, further comprises information conveyed in the meeting-relevant reference.

20. The non-transitory CRM of claim 11, wherein the method further comprises:
performing, by the collaboration platform service and upon meeting the window closure criterion for the asynchronous meeting, a non-iterative process, comprising:
- generating, based on the meeting management structure, meeting collateral associated with the asynchronous meeting; and
- transmitting the meeting collateral to the meeting organizer and the non-meeting organizer.

* * * * *